(No Model.) 4 Sheets—Sheet 1.
W. BAXTER, Jr.
ELECTRIC MOTOR.

No. 361,115. Patented Apr. 12, 1887.

WITNESSES:
L. Lee
Henry J. Theberath

INVENTOR
William Baxter Jr.
BY
Crane & Miller
ATTORNEYS.

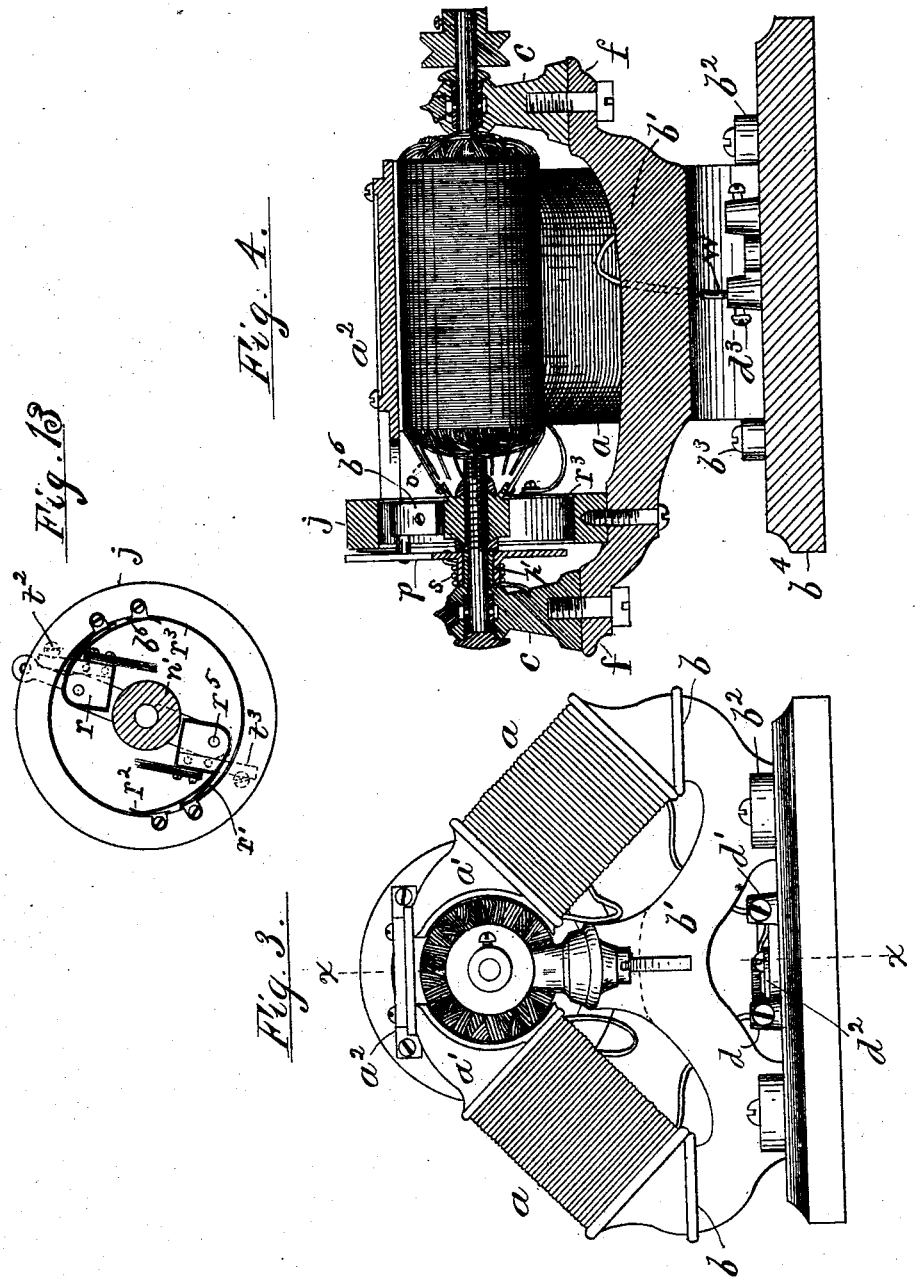

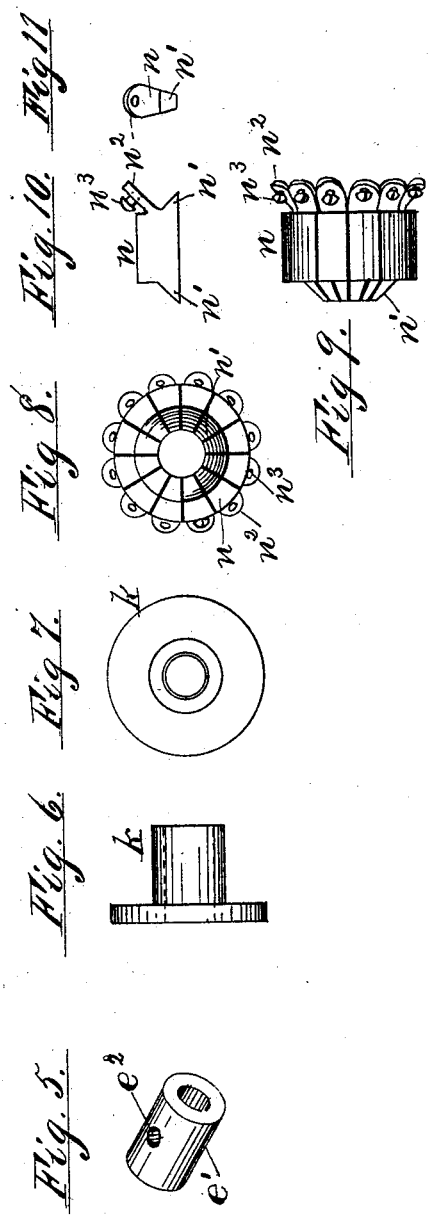

(No Model.) 4 Sheets—Sheet 4.
W. BAXTER, Jr.
ELECTRIC MOTOR.

No. 361,115. Patented Apr. 12, 1887.

Attest:
Wm Smith Morison.
D. Ross.

Inventor.
Wm Baxter, Jr., per
Crane & Miller Attys

UNITED STATES PATENT OFFICE.

WILLIAM BAXTER, JR., OF BALTIMORE COUNTY, MARYLAND, ASSIGNOR TO THE BAXTER ELECTRIC MANUFACTURING AND MOTOR COMPANY.

ELECTRIC MOTOR.

SPECIFICATION forming part of Letters Patent No. 361,115, dated April 12, 1887.

Application filed October 27, 1886. Serial No. 217,306. (No model.)

*To all whom it may concern:*

Be it known that I, WILLIAM BAXTER, Jr., a citizen of the United States, residing at Baltimore county, Maryland, have invented certain new and useful Improvements in Electric Motors, fully described and represented in the following specification and the accompanying drawings, forming a part of the same.

The object of this invention is more particularly to render a small electric motor more durable and effective and convenient for operation by persons unskilled in the use of machinery; and with this object in view the improvements consist in an improved construction for the armature and its commutator, and its connections between the field-magnet and the brushes.

They also consist in means for automatically detaching the brushes from the commutator when the brushes are placed in their inoperative position, in a particular form of bridge for uniting two inclined magnets, and in the combination with an arched bridge of projections for sustaining the armature-bearings, and in the combination and arrangement, with the arched bridge, of a bed-plate having a switch secured thereon beneath the arch, so as to protect the switch from derangement.

Figure 1:
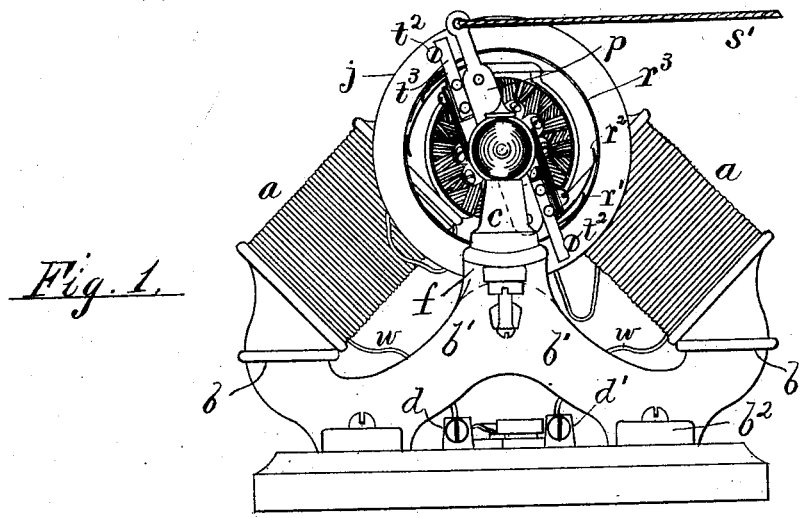
Figure 2:
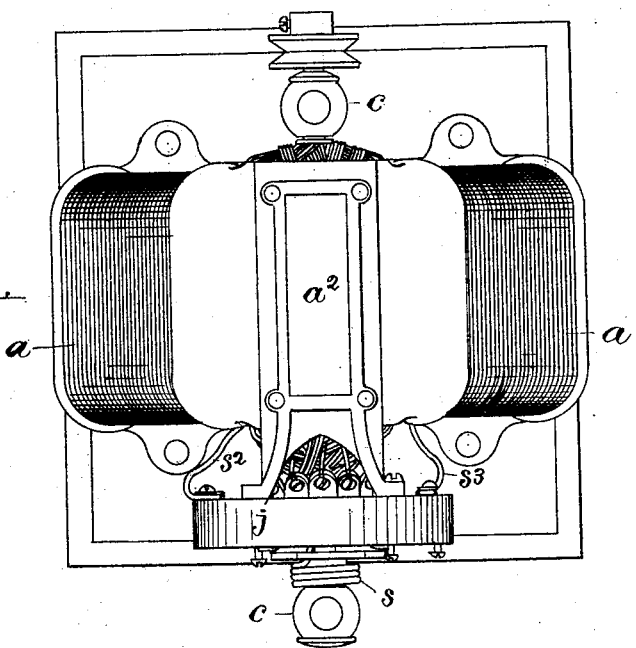
Figure 12:
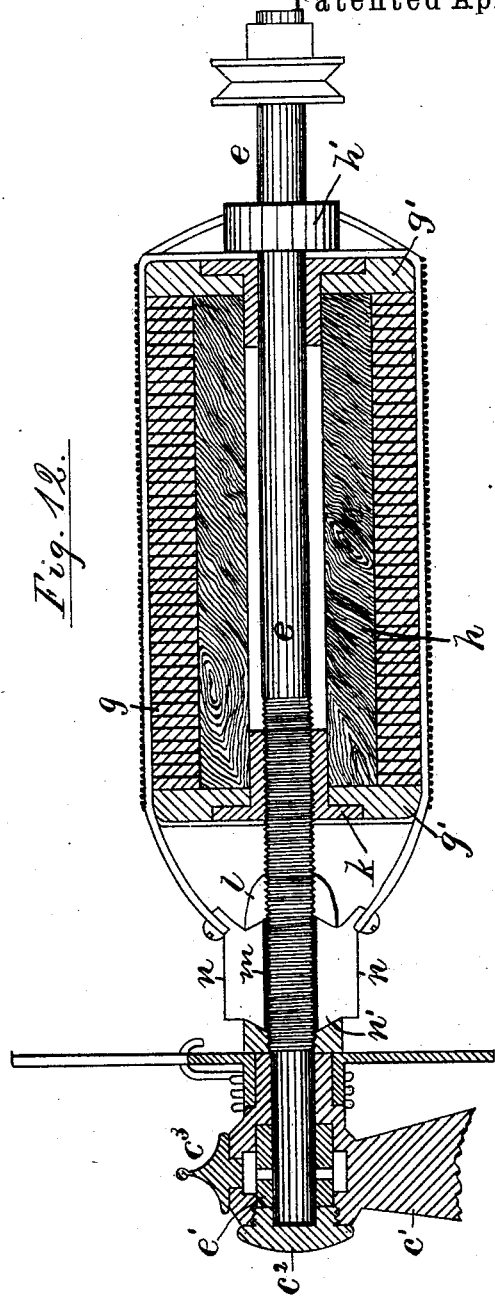

In the drawings, Figure 1 is a view of my improved motor, showing the commutator end of the frame. Fig. 2 is a plan of the machine; Fig. 3, a view of the end opposite to that shown in Fig. 1; Fig. 4, a vertical longitudinal section of the machine on line $x$ $x$ in Fig. 3, the armature not being shown in section; Fig. 5, a perspective view of a fiber bushing for one of the spindle-bearings. Fig. 6 is a side view, and Fig. 7 an end view, of one of the armature-nuts detached from the spindle. Fig. 8 is an end view, and Fig. 9 a longitudinal section, of the commutator upon a larger scale. Figs. 10 and 11 are, respectively, a side and end view of one section of the commutator. Fig. 12 is a longitudinal section of the armature, commutator, and spindle detached from the motor, upon a larger scale; and Fig. 13 is a view of the commutator-brushes and their attachments viewed from the opposite side to that shown in Fig. 1, the commutator circle $n'$ being merely hatched to show its location, but not its construction.

In my construction the field-magnets $a$ are inclined in a vertical plane with the poles at their upper ends, formed of head-pieces $a'$, united at the top by a tie-plate, $a^2$.

The bases of the magnets are connected by a bridge, which is formed with two seats, $b$, upon which the magnets are secured, and a central arch, $b'$, the sides of which slope upward nearly parallel with the magnets, but diverging slightly from the same toward their upper ends, so that the center of the arch, as shown in the section in Fig. 4, is considerably removed from the armature. This construction affords a very long bridge within a short space, thus bringing the field-coils proportionately nearer to the ends of the magnet, and the arched frame thus operates powerfully to concentrate the magnetic field at the central point where the armature is located.

The lower ends of the arch are provided with lugs $b^2$, by which the machine can be secured in any position to a suitable base. The machine may by such lugs be secured to the ceiling or wall of a room or to any part of another apparatus—as the stand of a sewing-machine—but is shown herein secured to a bed-plate, $b^4$, by screws $b^3$, and the wires $w$ from the field-magnets are carried through holes in the arch $b'$ to independent clamp-sockets $d$ $d'$, which are secured upon the base and connected by a switch-lever, $d^2$.

The sockets are preferably provided with button-head screws $d^3$, which can be loosened only by a screw-driver, and such construction, with the location of the switch and sockets under the arch $b'$, prevents any interference of unauthorized persons with the connections, while the switch-lever is perfectly accessible for actuation when required.

The motor is designed to be stopped and started by a cord-connection to the brush-carriers, and the later are therefore pivoted movably upon one of the journals and provided with a spiral spring, $s$, acting in opposition to the cord $s'$. (Shown in Fig. 1.)

The journal-bearings are formed as posts, having their lower ends concentric with the bearings and mounted upon lugs $f$, projecting from the opposite sides of the arch $b'$. The tops of the lugs, being bored out at the same time as the magnet-heads $a'$, are thus rendered perfectly concentric with the armature-spindle, and the posts c, being turned off upon their bases to fit such curved seats, the armature is thus readily fitted in its required position concentric with the heads a'.

The bearings for the spindle e are lined with bushings of vulcanized fiber e', which material is already extensively used for insulating an electrical apparatus, and my construction provides a recess, c', around such bearing within the head of the post c, and furnishes a cap, $c^2$, at the end of the spindle to prevent the escape of the lubricator, and a screw-plug, $c^3$, at the top of each bearing to provide for the renewal of the lubricant.

One of the fiber-bushings is shown detached in perspective in Fig. 5, and is provided at opposite sides with a hole, $e^2$, to admit the lubricator from the recess c'. In practice the recess c' is stuffed with hard grease, like tallow mixed with plumbago; and I find that the anti-friction qualities of the vulcanized fiber are so great and the friction of the spindle in the fiber bushing so very slight that sufficient heat to warm the tallow is only produced at very rare intervals when the lubricant within the bearing is entirely exhausted, and the small supply of grease derived from such heating of the fat suffices to prevent the heating of the bearing in any degree for a very long time thereafter, so that in practical operation the bearing constructed as I have described will remain efficient without attention for several months although running during the day-time at a speed of seven hundred and fifty revolutions per minute.

The armature is shown in Fig. 4 as constructed of a series of soft sheet-iron disks, g, alternated with paper upon a wooden barrrel, h. The disks are held between vulcanized-fiber heads g', which are clamped firmly upon the disks by a nut, h', screwed upon the arbor e at one end, and a nut, k, fitted to the arbor at the other end of the armature. By the insertion of the non-conducting vulcanized-fiber heads g' between the armature-disks g and the metallic flanges upon the nut k and collar h', any leakage of electricity from the disks to the flanges or to the shaft e is prevented in case the insulation of the disks becomes defective at the ends of the armature, and injurious currents are thus prevented from forming a circuit through the shaft or spindle e.

The nut is shown detached in Figs. 6 and 7, and is formed with a hub to fit the thread on the spindle, and with a flange to press upon the fiber-head g', which clamps the armature-disks firmly together upon the barrel h.

The commutator, as shown in Fig. 12, and also in the detached views in Figs. 8 to 11, inclusive, has its sections n formed with beveled ends n', and secured upon the spindle e by two nuts, l l', which are countersunk or recessed upon their inner sides to embrace such beveled ends and to clamp the same firmly to the spindle. A non-conducting packing, m, is applied between the sections and the adjacent surfaces to insulate the same. Each section is provided with an ear, $n^2$, in which a screw, $n^3$, is inserted, to conveniently attach the armature-connection o.

As shown in Fig. 12, the thread k', provided upon the spindle for the nut k, is continued along the shaft through the adjacent commutator, so as to answer for the application of the nuts l l' also. The nut h' may be replaced by a collar or shoulder upon the shaft, as only one nut is obviously required to clamp the armature together. The brushes $b^6$ are mounted upon a carrier-arm p, pivoted upon a sleeve, p', which projects from the inner side of the post around the spindle e.

The brush-holder consists in a block of fiber, r, pivoted upon a stud, $r^5$, fixed on the carrier and provided with a couple of leaf-springs, r' and $r^2$, which receive the current from the field-magnets. Such current is conveyed to the springs by a metallic lining, $r^3$, applied in two independent sections within a wooden ring, j, which is secured to the frame of the machine around the brushes and concentric with the spindle.

The lining $r^3$ is applied in two independent pieces within the upper and lower sides of the ring j, and the connections $s^2$ and $s^3$ from the field-magnets a are attached, respectively, to such lining-sections.

The springs r' and $r^2$ are united at their base, and are connected directly with one brush, and when the motor is in operation both of the springs rest upon one of the linings $r^3$, and thus place the brush in communication with the corresponding field-magnet.

The brush-carriers are arrested, when rotated by the spring s to their inoperative position, by pins $t^2$, affixed in the edge of the ring j, and levers $t^3$ are attached to the brush-blocks r, to bear against the pins $t^2$ and tip the blocks, so that the brushes are retracted from the commutator when the arm p is in this position.

The reaction of the springs r' and $r^2$ against the interior of the ring j tends to press the brushes elastically against the commutator with the required degree of force; but the spring s is formed with a greater degree of power, and thus serves to rotate the blocks r upon their studs $r^5$ when the arm p is turned sufficiently upon the sleeve p' to press the levers $t^3$ against the pins $t^2$. The springs r' and $r^2$, attached to each of the brushes, also perform the function of cutting out the armature when the motor is at rest, for which purpose the spring $r^2$ is made longer than the other, and is arranged to slide off of the lining $r^3$, upon which it normally operates, and to bear upon the opposite section of the lining which commutates with the opposed magnet.

When the arm p is turned by the spring s to its inoperative position, as shown in Figs. 1 and 13, the springs r' and $r^2$ therefore bear, respectively, upon both of the linings $r^3$, and serve to connect them elastically, thus furnishing a short circuit for the field-current through the two linings $r^3$ and the springs r' and $r^2$. The wooden ring $j$ is sustained upon one of the lugs $f$ upon the arch $p'$, and is also braced at its upper end by an extension of the plate $a^2$. This ring is entirely free from electrical connections upon its periphery and outer flat side, and as it wholly encircles and covers the brushes and their electrical connections, it serves in the most effectual manner as a shield to protect the latter from accidental interference and injury.

The field-magnets are detachably secured to the seats $b$ by screws $b^2$, so that they may be removed for convenient winding, and the various parts are, in practice, made interchangeable, so that they may be produced with the utmost uniformity and cheapness.

By the construction for the bridge the greatest possible effect is secured in the magnetic field, while the construction of the spindle $e$ with a continuous screw-thread, $k'$, to receive the nuts $k$, $l$, and $l'$, simplifies the construction and enables the constructor to use uniform tools in the formation of all the nut-threads. The construction of the armature, its brushes, and their electrical connections affords the greatest possible protection both to the apparatus and to unskilled parties who may be required to use the same.

I am aware that it is not new to curve the bridge in an electric motor to increase the length of the same between the poles; but I am not aware that it has ever been done in connection with inclined magnets, or that the bridge has ever been curved or bent into a line with the axes of the magnets, so as to form an arch with its middle extended toward the magnetic field, as in my construction. It will be noticed in Fig. 1 that the arch's sides $b'$ are inclined in substantially the same direction as the axes or cores of the magnets, and that to form the seats $b$ in the same plane for convenience of manufacture the bases of the magnet, which set farther apart than their heads, require to be formed with certain wedge-shaped portions $a'$, to which the winding of field-wires cannot be applied. The magnets formed with such wedge-shaped bases and the bridge arched toward the magnetic field, and having the seats $b$ in the same plane, I believe to be new, and not similar in either form or operation to any bridge formed as a flat plate.

I have not claimed herein the particular construction for the anti-frictional bearings, as shown in the section at the left-hand end of Fig. 12, as I am about to file a separate patent application for the same.

I hereby disclaim the construction for the spindle-bearings shown herein, as I have made the same the subject of a separate application, No. 227,143, filed February 10, 1887.

Having thus set forth my invention, what I claim herein is—

1. In an electric motor, the combination, with two field-magnet poles inclined toward one another, as described, and having an armature rotated between their nearer ends, of a bridge connecting their farther ends and extended across between such ends, the bridge being arched at its middle toward the magnetic field, as and for the purpose set forth.

2. In an electric motor, the combination, with two field-magnet poles inclined toward one another, as described, and having an armature rotated between their nearer ends, of a bridge connecting their farther ends and arched at its middle toward the magnetic field and provided at the top of the arch with projecting lugs $f$, to sustain suitable bearings for the armature, as and for the purpose set forth.

3. In an electric motor, the combination, with two field-magnet poles inclined toward one another, as described, and having an armature rotated between their nearer ends, of the bridge $b'$, connecting their farther ends and arched toward the magnetic field, with its sides nearly parallel to the axes of the magnet $a$, and the bridge being formed at its outer ends with the two seats $b$ in the same plane and the magnet being formed with wedge-shaped bases to fit such seats, as and for the purpose set forth.

4. In an electric motor, the combination, with two field-magnet poles inclined toward one another, as described, of a bridge connecting the bases of the magnets and arched toward the magnetic field, as described, and provided with the lugs $f$, projected laterally from the crown of the arch and sustaining-posts $c$, provided with bushings of vulcanized fiber $e'$, to form bearings for the armature-spindle, as and for the purpose set forth.

5. In an electric motor, the combination, with the armature having disks $g$ and heads $g'$, clamped upon a threaded arbor or spindle by a nut and collar, of a thread, $k'$, extended from the clamping-nut $k$ through a commutator, and the latter having its sections $n$ formed with beveled ends $n'$ and clamped upon the arbor by two countersunk nuts, $l\ l'$, fitted to the same thread as the armature-nut $k$, as and for the purpose set forth.

6. In an electric motor, the combination, with the ring $j$, surrounding the brushes and provided with the metallic linings $r^3$, in electrical connection, respectively, with the two field-magnets, of the brushes provided each with a yielding spring, $r'$, adapted to bear elastically upon one of the linings $r^3$, as and for the purpose set forth.

7. In an electric motor, the combination, with the ring $j$, surrounding the brushes and provided with the metallic linings $r^3$, in electrical connection, respectively, with the two field-magnets, of the brushes provided each with the shorter spring, $r'$, and the longer spring, $r^2$, the two springs being adapted to bear elastically against the metallic linings $r^3$ and to form an electrical connection between the field-magnets when the brushes are in their inoperative position, as and for the purpose set forth.

8. In an electric motor, the combination, with the ring $j$, surrounding the brushes and provided with the metallic linings $r^3$, in electrical connection, respectively, with the two field-magnets, of the brushes pivoted by holders upon the arm $p$, the spring $s$, affixed to the frame and operating to turn the arm and brushes to an inoperative position, the springs operating to press the brushes toward the commutator, levers $t^3$, affixed to the brush-blocks and projected at the side of the ring $j$, and stops $t^2$ upon such ring to check the levers and move the brushes away from the commutator when the arm is thrown into its inoperative position.

In testimony whereof I have hereunto set my hand in the presence of two subscribing witnesses.

WM. BAXTER, JR.

Witnesses:
GEO. J. MCCAFFREY,
HENRY S. THOMPSON.